US006820467B2

(12) United States Patent
Streib

(10) Patent No.: US 6,820,467 B2
(45) Date of Patent: Nov. 23, 2004

(54) METHOD AND ARRANGEMENT FOR CHECKING THE TIGHTNESS OF A VESSEL

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/356,643

(22) Filed: Feb. 3, 2003

(65) Prior Publication Data

US 2003/0213295 A1 Nov. 20, 2003

(30) Foreign Application Priority Data

Feb. 1, 2002 (DE) ........................................ 102 04 132

(51) Int. Cl.[7] ................................................ G01M 3/04

(52) U.S. Cl. .......................................... 73/49.2; 702/51

(58) Field of Search ................................ 73/40, 40.5 R, 73/49.7, 118.1; 123/518, 519, 520; 702/51

(56) References Cited

U.S. PATENT DOCUMENTS 3,872,712 A * 3/1975 Westervelt et al. ............ 73/40
4,441,357 A * 4/1984 Kahn et al. .................... 73/40
4,523,452 A * 6/1985 Brayman ....................... 73/40
5,890,474 A * 4/1999 Schnaibel et al. .......... 123/520
6,131,550 A * 10/2000 Fritz et al. .................. 123/520
6,615,808 B2 * 9/2003 Streib ......................... 123/520

* cited by examiner

*Primary Examiner*—Charles D. Garber
(74) *Attorney, Agent, or Firm*—Walter Ottesen

(57) ABSTRACT

The invention relates to a method for checking the tightness of a vessel and especially of a tank-venting system of a motor vehicle. In the method, at least a reference leak (42) or the vessel is subjected to an overpressure or underpressure with at least one pressure source. At least one characteristic variable of the pressure source is determined (reference measurement or diagnostic measurement) and these characteristic variables are compared to each other and a conclusion is drawn as to the presence of a leak from the result of the comparison. The pumping power of the at least one pressure source is changed during the reference measurement and/or during the diagnostic measurement.

8 Claims, 4 Drawing Sheets

Fig.1

METHOD AND ARRANGEMENT FOR CHECKING THE TIGHTNESS OF A VESSEL

FIELD OF THE INVENTION

The invention relates to a method and an arrangement for checking the tightness of a vessel and especially of a tank-venting system of a motor vehicle.

BACKGROUND OF THE INVENTION

Vessels must be regularly checked as to their tightness in the most different areas of technology. For example, vessels for liquid or gas are checked in the chemical processing industry and tank systems are checked in the motor vehicle industry.

Because of more stringent statutory requirements for the operation of internal combustion engines, it will be necessary to provide control arrangements in motor vehicles wherein also fuels such as gasoline are utilized and this control arrangement must be able to detect an existing leak of the magnitude of 0.5 mm in the tank or in the total fuel system utilizing on-board means.

A method of this kind for checking the tightness of a tank-venting system of a motor vehicle is disclosed, for example, in U.S. Pat. No. 5,890,474. In this method, a back pressure is formed in the region between an electrically operated pump and a reference leak. The back pressure reduces the pump rpm and simultaneously increases the electric current drawn by the pump. For checking, the current increase when pumping against the preconnected reference leak with reference to the idle current of the pump is compared to the current increase which results relative to the idle current when pumping into the tank. Tank leakages having an opening cross section of less than that of the reference leak lead to the reference current, which was determined previously, being exceeded; whereas, leaks having cross sections greater than that of the reference leak do not cause the current to increase so far.

It can take some minutes until the backpressure, which is required for a tank measurement, is built up in dependence upon the tank volume and the tank fill level which corresponds to the backpressure when pumping against the reference leak. Because the tightness check takes place during after-running (that is, when the engine is switched off), the battery of the motor vehicle is loaded by the long diagnosis time.

SUMMARY OF THE INVENTION

It is an object of the invention to improve upon the method mentioned initially herein for the tightness check of a vessel so that the diagnosis time is reduced. This vessel can be especially a tank-venting system of a motor vehicle.

The basic idea of the method of the invention is to reduce the diagnosis time as well as the pressure level at which measurements are made by changing the pumping power of the pressure source during a reference measurement and/or during a diagnosis measurement.

In an advantageous embodiment of the method, the pumping power of the pressure source is reduced during the reference measurement, whereupon (preferably during an early phase of the diagnosis measurement) the pumping power is increased over a pregivable time interval. After the elapse of the time interval, the pump power of the pressure source is reduced to the level present before the increase. The advantage here is that for generating the pressure introduced at reduced pumping power, a lesser air volume is required than at higher pressures whereat reference and diagnostic measurements are carried out known to the state of the art. In order to be able to introduce this lower air volume rapidly, the pumping power of the pressure source during the diagnostic measurement is increased over a pregiven time interval and after the elapse of this time interval, the pumping power is again reduced to the level in advance of the increase.

In a further advantageous embodiment of the method, a comparison of characteristic variables of the pressure source takes place on the basis of the reduced pumping power of the pressure source. In experiments, it has been determined that a significant shortening of the diagnostic time is achieved when the pressure source is driven at increased pumping power for the duration of the buildup of the reduced pressure during the diagnostic measurement. The characteristic variables are determined at reduced pumping power.

If the conclusion is drawn as to a pressure not sufficiently great for the diagnostic measurement for the result from the comparison of the characteristic variables at reduced pumping power, then, in another advantageous embodiment of the method, the pumping power is again increased over at least a pregivable time interval during the diagnostic measurement. In this way, the pressure buildup is significantly accelerated, whereby a further shortening of the diagnostic time is achieved.

In an advantageous embodiment of the method, the particular time intervals are determined in dependence upon the fill level and the volume of the vessel. In this way, the required air volume is precisely determined. From this air volume and the increased pumping power per time interval, the required length of the time interval (over which this air volume is introduced into the vessel at increased pumping power), can be pregiven with high accuracy. In this way, it is prevented that the required air volume and therefore the required pressure are exceeded because of a too long an operation of the pressure source at increased pumping power.

With respect to the change of the pumping power and the determination of characteristic variables, the most different configurations of the method are conceivable.

An advantageous embodiment of the method provides that the pumping power of at least an electrically-driven pump is changed in that the pump voltage is varied and that at least one pump current and/or at least one pump pressure is determined as a characteristic variable. In this way, already existing components can be used for carrying out the method and only minor technical changes need be made.

In a further embodiment, the pump voltage is varied in that the electrically operated pump is clock driven whereby, for example, a very precise adjustment of the pumping power takes place with a variation of the drive pulse duty factor.

An arrangement according to the invention for carrying out the method for checking the tightness of a vessel includes at least one means for changing the pumping power of the pressure source during a charge of the reference leak and/or of the vessel with pressure. It is advantageous that with this means, the diagnosis time and the pressure level are reduced by changing the pumping power.

In a preferred embodiment, this means is realized cost effectively and technically simply via at least one resistance which can be switched in and out in a current loop of an electrically-driven pressure source and/or by at least one means for clocking the at least one supply voltage of this pressure source. It is advantageous that only a resistance or switching means are to be mounted in or at a control unit which is anyway available. A control of the switching means and the detection of the pressure source current take place with existing components, especially by programming these components in a control unit.

In a further advantageous embodiment, a switching means for selectively connecting an electrically-operated pressure source to at least one of at least two different supply voltages is provided for changing the pumping power.

The supply voltages can be provided in different ways. Two supply voltages can be realized, especially in a motor vehicle with a two-voltage on-board electrical system, in a cost effective and technically simple manner. Since the two voltages are anyway available, only the supplementing of the arrangement by a switch for selectively connecting the pressure source to one of the two supply voltages is required.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
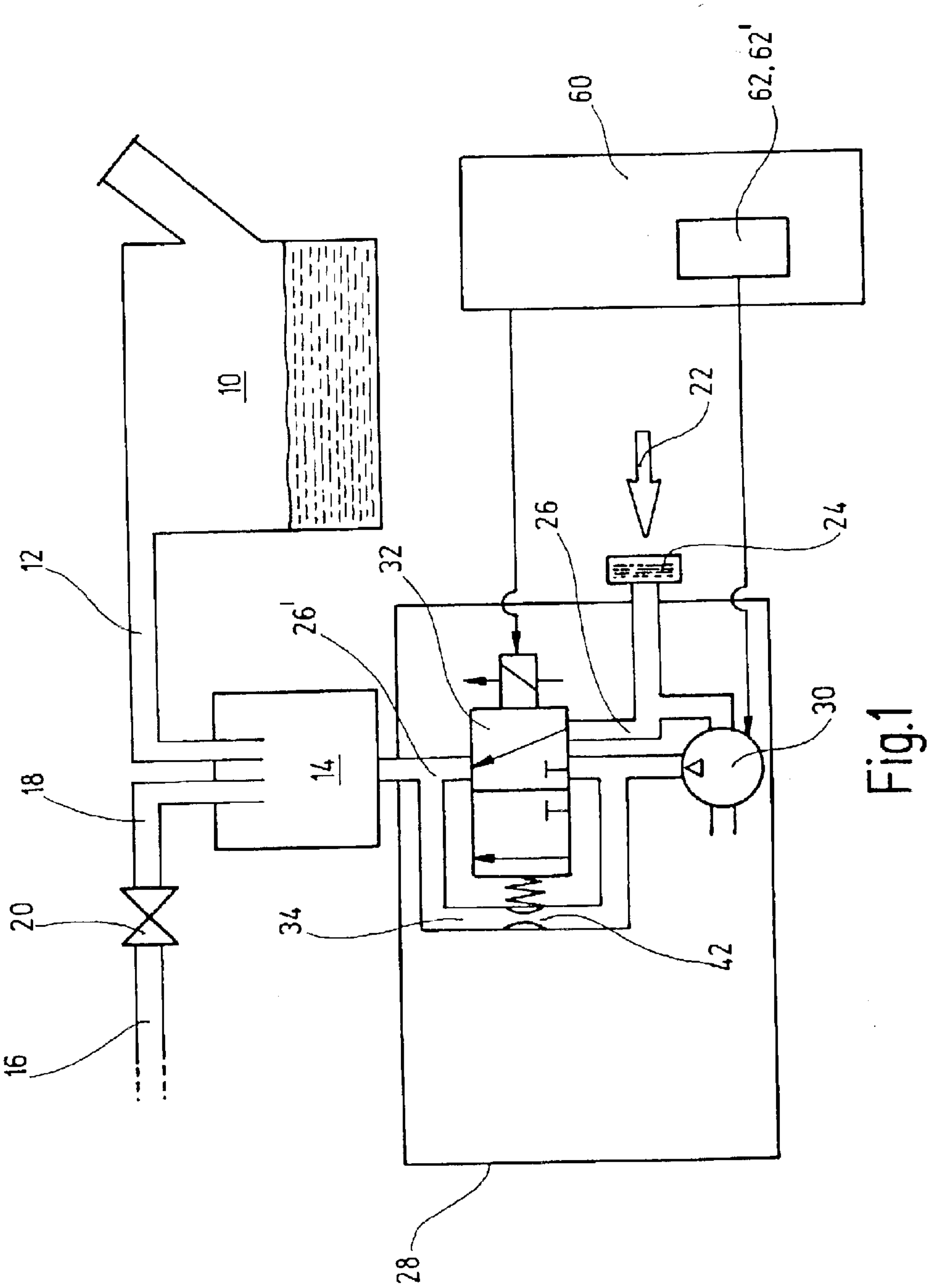
FIG. 1 is a schematic of a tank-venting system of the invention suitable for carrying out the method of the invention.

A tank-venting system is shown schematically in FIG. 1 and includes a tank 10 which is connected via a tank connecting line 12 to an active charcoal filter 14. An intake manifold 16 of an internal combustion engine (not shown) is connected to the tank 10 via an intake line 18, an active charcoal filter 14 as well as via a tank-venting valve 20 mounted in the intake line.

For operating the engine or when tanking the tank 10, volatile hydrocarbon vapors form in the tank 10 which reach the active charcoal filter 14 via the line 12 and are reversibly bonded in the filter in a manner known per se.

The tank-venting valve 20 is driven so as to open from time to time by means of a control unit 60. Fresh air 22 is drawn from the ambient through the active charcoal filter 14 when the switchover valve 32 is correspondingly driven. The switchover valve 32 can, for example, be a 3/2-directional valve which is likewise driven by the control unit 60 in a manner known per se. Any fuel vapors stored in the active charcoal filter 14 are imparted to the inducted air and the active charcoal filter 14 is regenerated thereby. Furthermore, a passive filter 24 is provided, which connects the tank-venting system or a line (26, 26') to the ambient air in the vicinity of the engine. The lines (26, 26') are connected ahead of the active charcoal filter 14.

In order to diagnose the tightness of the tank-venting system, a diagnostic unit 28 is provided which is connected ahead of the active charcoal filter 14. It should be noted that the position shown for the diagnostic unit 28 within the total tank-venting system is only by way of example and that this unit, depending upon the application, can be mounted also at another location such as directly at the tank 10.

The diagnostic unit 28 includes an electrically-operated pump 30 driven by means of a pump control unit (62, 62'). The electrically-driven pump 30 can, for example, be an electrically-operated reciprocating pump. The pumping power of the pump 30 is increased or reduced with the pump control unit (62, 62').

The pump control unit (62, 62') can be part of the control unit 60. This can be understood to be exemplary. The pump control unit (62, 62') can also be separate or be mounted in some other way to the pump unit 60 or in the pump unit 60.

It is understood that, in lieu of an electrically-operated reciprocating pump, also another pump type can be used wherein the pumping power can be changed. Such a pump type can, for example, be a vane-cell pump or a membrane pump.

The switchover valve 32 is connected forward of the pump 30. A reference leak 42 is arranged in a line branch 34 arranged parallel to the switchover valve 32. The dimensioning of the reference leak 42 is so selected that it corresponds approximately to the size of the leak to be detected. In the case of the initially-mentioned statutory requirements, the reference leak 42 has an opening cross section of approximately 0.5 mm.

The switchover valve 32 has two switch positions. In a first switch position I, a reference measurement is carried out first based on the reference leak 42 and is the first diagnostic step. For this purpose, the switchover valve 32 is fully closed so that the backpressure which builds up forward of the reference leak 42, or the resulting electrical pump current (reference current) of the pump 30 is detected and is likewise intermediately stored.

In a second switching position II (not shown), the switchover valve 32 is open toward the tank 10. In this position, a diagnostic measurement is carried out in that a pressure is built up in the tank 10 and the pump current i of the pump 30 is detected for the particular pump power (diagnostic current).

The method of the invention is described in the following with the above-described arrangement for checking tightness of a tank-venting system of a motor vehicle.

Figure 2:
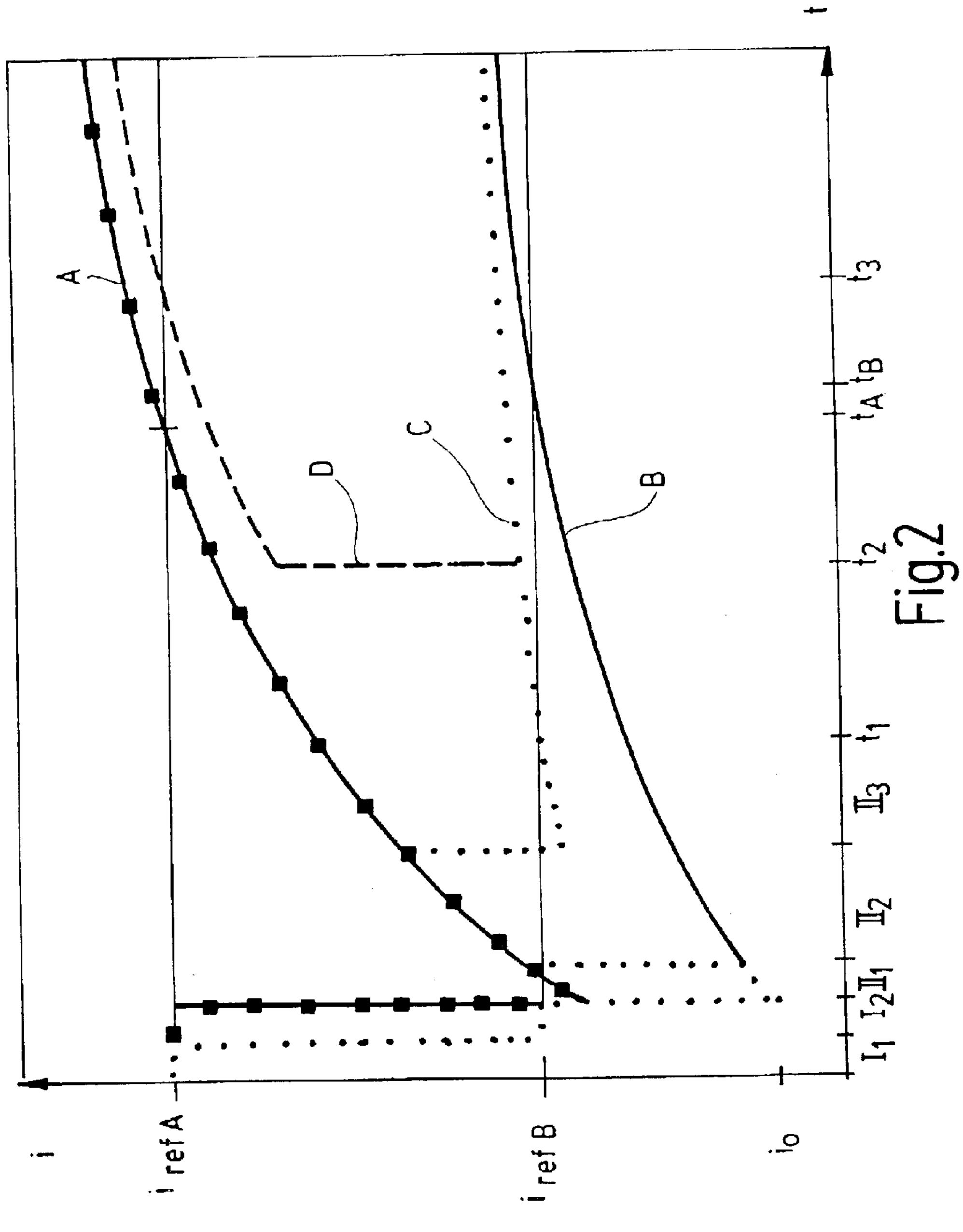
FIG. 2 schematically shows time-dependent electric current traces for a change of the pumping power in accordance with the invention of an electrically-operated pump utilized for checking tightness.

FIG. 2 shows the trace of the pump current i as a function of time in the presence of a leak having a cross section less than that of the reference leak 42. The pumping power of the pump 30 is varied during the reference measurement or the diagnostic measurement (see curves C and D).

The variation of the pumping power takes place, for example, by changing the pump voltage.

In principle, other operating variables of the pump 30 can also be changed. For example, a passthrough cross section at the pump output can be changed. If a membrane pump is used, the stroke frequency thereof can, for example, be changed.

As a comparison, the current trace is shown in curve A which would result if the pump 30 would be operated over the entire duration of the reference measurement (time interval $I_1$, $I_2$) and the total duration of the diagnostic measurement (time interval $II_1$, $II_2$ and $II_3$) with the same increased pumping power. For increased pumping power, the reference current assumes the value $i_{refA}$ when reaching the backpressure.

A larger pressure is built up in the tank 10 when a leak in the tank 10 is less than the reference leak. This leads to the situation that the diagnostic current is greater than the reference current $i_{refA}$ starting at time point $t_A$.

In a measurement having the current trace shown by curve B, the pumping power of the pump 30 was reduced over all time intervals (time intervals $I_1$, $I_2$, $II_1$, $II_2$, $II_3$). The diagnostic current is here greater than the corresponding reference current $i_{refB}$ starting at time point $t_B$.

Curve C shows the current trace for a diagnosis in accordance with the invention during which the pumping power of the pump 30 is varied.

During a pregivable time interval $I_1$, preferably for 5 to 15 seconds, a reference measurement is first carried out at increased pumping power of the pump 30. Here, a pumping current $i_{refA}$ is determined. This reference measurement is one option which is especially omitted when no further diagnosis is carried out at increased pumping power following the diagnosis at reduced pumping power. This further diagnosis is especially carried out when it is shown in the later course of the diagnosis described hereinafter that the diagnosis at reduced pumping power is insufficient in order to be able to make a reliable statement as to the possible presence of a leak. The further diagnosis at increased pumping power starting at time point $t_2$ is described hereinafter in an advantageous embodiment of the method.

Following the interval $I_1$, the pumping power of the pump 30 is reduced during the pregiven time interval $I_2$ for a duration of, for example, 10 to 20 seconds. The pumping power then assumes the value $I_{refB}$.

Following the time interval $I_2$, the switchover valve 32 is brought into switching position II at the beginning of the time interval $II_1$, whereby pressure is applied to the tank 10.

During this time interval $II_1$, a diagnostic measurement is carried out for a short time, for example, 5 to 10 seconds, during which time the pumping power of the pump 30 is reduced. At the start of this time interval, the idle current $i_0$ of the pump 30 is detected.

Thereafter, for a time interval $II_2$, for example, for 25 to 30 seconds, the pumping power is again increased.

In this way, the pressure in the tank 10 is rapidly increased to the extent that it corresponds to the backpressure against the reference leak 42 at a reference measurement with reduced pumping power. The air volume necessary therefor is determined from the tank volume and the tank fill level. In an approximation, the air volume is the difference between the tank volume and the tank fill level. The duration of the time interval $II_2$ is, as an approximation, the quotient of the required air volume and the increased pumping power of the pump 30.

After time interval $II_2$, the pumping power of the pump 30 is again reduced in order to compare the pump current i, which is determined during a following time interval $II_3$, to the reference current $i_{refB}$ determined during the time interval $II_2$. In the present embodiment, the pump current i starting at time point $t_1$, becomes greater than the reference current $i_{refB}$ from which it is concluded that a leak, which is possibly present, is not greater than the reference leak 42. The interval $II_3$ preferably ends with the detection of the pump current $i_{refB}$ being exceeded at time point $t_1$. It is understood, however, that the time point $t_1$ can also lie within this interval so that the diagnostic measurement is also continued further after the pump current $i_{refB}$ is exceeded.

For a constant pumping power of the pump 30, the particular reference current $i_{refA}$ or $i_{refB}$ would only be reached at time point $t_A$ or $t_B$ (curve A or curve B); that is, significantly later than in the present embodiment.

In an embodiment of the method, a further diagnosis at increased pumping power is especially carried out in accordance with curve D when, from the course of the diagnosis up to now at reduced pumping power, it cannot be concluded reliably that no leak is present which is greater than the reference leak 42. For this purpose, the pumping power is again increased after time point $t_1$, namely, at time point $t_2$.

If the pump current i reaches the value $i_{refA}$ of the reference current, for example, at a time point $t_3$ at increased pumping power, then the conclusion is drawn herefrom that a possibly present leak cannot be greater than the reference leak.

The execution of the further diagnosis at increased pumping power increases the reliability of the diagnosis.

In principle, another sequence in the change of the pumping power can be selected during the method. Thus, the pumping power can again be increased for a short time during a diagnostic measurement at reduced power in the time interval $II_3$ in the event that the diagnostic current is considerably less than the reference current $I_{refB}$ which is to be reached. In this way, the required pressure is built up more rapidly and the diagnostic time is shortened.

Figure 3:
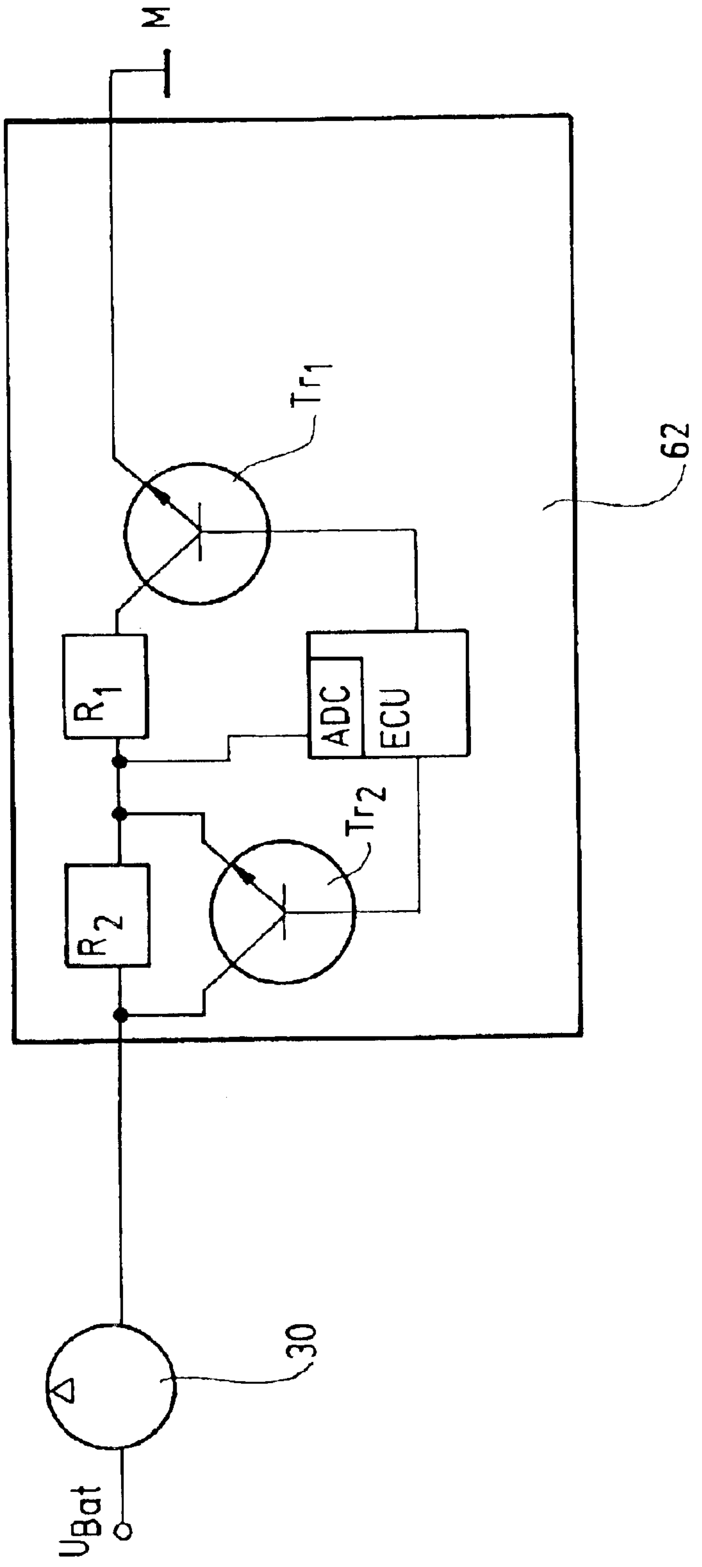
FIG. 3 is a circuit diagram of a control unit for controlling the pumping power of the pump by changing the pump voltage; and, FIG. 4 is a circuit diagram of a control unit for controlling the pumping power of the pump by clocking the pump voltage.

The circuit diagram for the pump control unit 62 is shown in FIG. 3 by way of example. With this pump control unit, the pump voltage of a pump 30 can be changed by switching a resistor $R_2$ in and out.

The pump current loop of the pump 30 is opened and closed between the voltage connection $U_{bat}$ and the ground connection M by means of a transistor $Tr_1$. A direct connection between the pump 30 and the voltage connection $U_{bat}$ is provided only by way of example. The transistor $Tr_1$ is switched via its base by means of the electronic control unit ECU. The pump current I is determined from the voltage at a resistor $R_1$ in the pump current loop with an analog-to-digital converter ADC.

The voltage at pump 30 and therefore the pump current i and its pumping power are reduced by the voltage drop across the resistor $R_2$, which is switched in, in the pump current loop.

If a further transistor $Tr_2$ (whose collector and emitter are connected to the respective terminals of the resistor $R_2$) is switched to be conductive, then the resistor $R_2$ is short circuited. In this way, the pump voltage, and therefore also the pumping power, is increased. The control of the transistor $Tr_2$ takes place via the control unit ECU connected to the base of this transistor.

Figure 4:
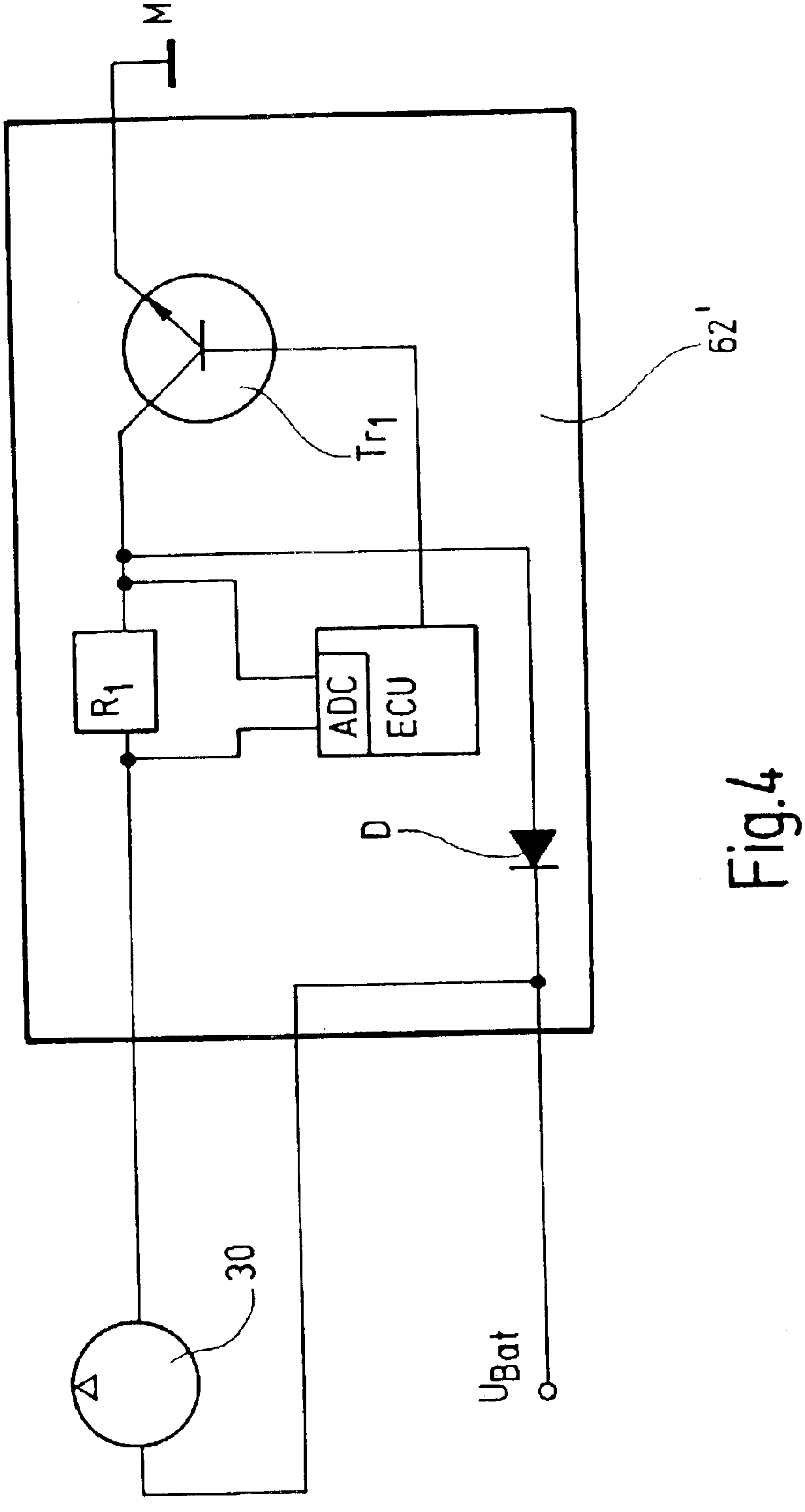

In FIG. 4, an alternative circuit of a control unit 62' is shown with which the pump 30 is driven in a clocked manner by a pulsewidth-modulated signal.

Here too, as in the embodiment shown in FIG. 3, the supply voltage is switched by the transistor $Tr_1$. The pump current i is determined from the voltage, which drops across the transistor $R_1$, with the analog-to-digital converter ADC.

In the embodiment shown in FIG. 4, the transistor $Tr_1$ is switched by the control unit ECU via its base, preferably at a high frequency so that the voltage of the pump 30 is modulated. The pumping power increases with reducing clock frequency and increasing switch-on duration of the transistor $Tr_1$. During a switch-off phase of the transistor $Tr_1$, the pump 30 is short circuited by a diode D, which is arranged between the voltage terminal $U_{bat}$ and the connection of the resistor $R_1$, which faces away from the pump 30, in the passthrough direction.

It is understood that also other embodiments for controlling the pumping power are possible. Accordingly, when, for example, using a membrane pump, the stroke frequency can be changed. A further possibility is to connect a controllable throughput downstream of the pump in the air channel.

In principle, it is also possible to realize the pump control unit (62, 62') in another embodiment than shown in FIGS. 3 and 4. Likewise, the polarity of the connections of the voltage supply is understood to be only exemplary.

A further embodiment provides for changing the pumping power of the pump 30 by selectively connecting the various voltages which are anyway available. This is especially the case in a motor vehicle having a two-voltage on-board electrical system. This is so because only a further changeover switch need be provided for selectively connecting the pump 30 to one of the two voltages in the arrangement.

The above-described method is carried out and the above-described arrangement is utilized for checking the tightness of tank-venting systems in motor vehicles.

It is understood that such a method and such an arrangement can, if required, also be used in other technical areas for checking tightness of other vessels, for example, for liquid and gas vessels with only slight modifications.

It is understood that the foregoing description is that of the preferred embodiments of the invention and that various changes and modifications may be made thereto without departing from the spirit and scope of the invention as defined in the appended claims.

What is claimed is:

1. A method for checking the tightness of a vessel including a tank-venting system of a motor vehicle, the method comprising the steps of:

selectively applying an overpressure or an underpressure utilizing a pressure source to a reference leak and to said vessel to make reference and diagnostic measurements, respectively;

changing the pumping power of said pressure source during at least one of said reference and diagnostic measurements;

detecting a characteristic quantity of said pressure source with each application of said overpressure or underpressure; and, comparing said characteristic quantities to each other and drawing a conclusion from the result of the comparison as to the presence of a leak.

2. The method of claim 1, comprising the further steps of:

reducing the pumping power of said pressure source during the reference measurement;

thereafter, increasing said pumping power over a pregivable time interval during an early phase of said diagnostic measurement; and, after the elapse of said time interval, reducing said pumping power of said pressure source to the level present before the increase thereof.

3. The method of claim 2, wherein the comparison of said characteristic quantities is made on the basis of the reduced pumping power of said pressure source.

4. A method for checking the tightness of a vessel including a tank-venting system of a motor vehicle, the method comprising the steps of:

selectively applying an overpressure or an underpressure utilizing a pressure source to a reference leak and to said vessel to make reference and diagnostic measurements, respectively;

changing the pumping power of said pressure source during at least one of said reference and diagnostic measurements;

detecting a characteristic quantity of said pressure source with each application of said overpressure or underpressure;

comparing said characteristic quantities to each other and drawing a conclusion from the result of the comparison as to the presence of a leak, wherein the comparison of said characteristic quantities is made on the basis of the reduced pumping power of said pressure source;

reducing the pumping power of said pressure source during the reference measurement;

thereafter, increasing said pumping power over a pregivable time interval during an early phase of said diagnostic measurement;

after the elapse of said time interval, reducing said pumping power of said pressure source to the level present before the increase thereof; and, increasing the pumping power during the diagnostic measurement again over at least a pregivable additional time interval in the event that a conclusion is drawn from the result of comparison at reduced pumping power as to an insufficiently large pressure for the diagnostic measurement.

5. The method of claim 4, comprising the further step of determining said time intervals in dependence upon the fill level and the volume of said vessel.

6. The method of claim 4, comprising the further steps of changing the pumping power of at least one electrically operated pump in that the pump voltage thereof is varied; and, at least the pump current i and/or a pumping pressure is determined as the characteristic quantity.

7. The method of claim 6, comprising the further step of varying the pump voltage in that said electrically operated pump is driven with a clocked signal.

8. The method of claim 1, wherein a connection between the pressure source and the vessel is interrupted during said reference measurement.

* * * * *